US012175892B2

(12) United States Patent
Fronczek

(10) Patent No.: US 12,175,892 B2
(45) Date of Patent: Dec. 24, 2024

(54) SIGN ASSEMBLY WITH LIGHT MOUNTING BRACKET

(71) Applicant: Dee Sign USA, LLC, West Chester, OH (US)

(72) Inventor: Joseph S. Fronczek, Clarksville, OH (US)

(73) Assignee: DEE SIGN USA, LLC, West Chester, OH (US)

(*) Notice: Subject to any disclaimer, the term of this patent is extended or adjusted under 35 U.S.C. 154(b) by 107 days.

(21) Appl. No.: 18/068,928

(22) Filed: Dec. 20, 2022

(65) Prior Publication Data

US 2024/0203300 A1 Jun. 20, 2024

(51) Int. Cl.

*G09F 13/00* (2006.01)
*F21V 21/00* (2006.01)
*G09F 13/02* (2006.01)
*G09F 13/18* (2006.01)

(52) U.S. Cl.

CPC .............. *G09F 13/02* (2013.01); *F21V 21/00* (2013.01); *G09F 13/18* (2013.01)

(58) Field of Classification Search

CPC .......... G09F 13/02; G09F 13/18; F21V 21/00; F21V 21/088; F21V 21/0885; A47B 87/008; A47B 87/02; A47G 25/0614; A47G 25/0642; F16M 13/02; F16B 5/0635; Y10T 24/44017

USPC .......... 211/183; 248/237, 231.3, 231.8, 48.1, 248/48.2, 214, 227.1, 227.2, 227.4, 228.1, 248/228.7

See application file for complete search history.

(56) References Cited

U.S. PATENT DOCUMENTS

| | | | | |
|---|---|---|---|---|
| 1,788,843 | A | 1/1931 | Overholtz | |
| 2,994,462 | A * | 8/1961 | Hirsch | A47G 25/743 223/85 |
| 5,101,329 | A | 3/1992 | Doyle | |
| 5,217,296 | A | 6/1993 | Tanner | |
| 5,467,076 | A | 11/1995 | Ruocco | |
| D378,143 | S | 2/1997 | Kollins | |
| 6,004,002 | A | 12/1999 | Giannone | |
| 6,263,601 | B1 | 7/2001 | Emert | |
| D668,529 | S * | 10/2012 | Harris | D8/370 |
| D784,044 | S * | 4/2017 | Sokoly | D6/552 |
| 10,181,273 | B2 * | 1/2019 | Norman | G09F 3/204 |
| D843,739 | S * | 3/2019 | Carlson | D6/327 |
| 2004/0177538 | A1 | 9/2004 | De Ruyter | |

(Continued)

*Primary Examiner* — Cassandra Davis
(74) *Attorney, Agent, or Firm* — THOMPSON HINE LLP

(57) ABSTRACT

A sign assembly includes a frame with first and second upright frame members and A lateral frame member interconnecting the first and second upright frame members, the lateral frame member comprises an L-shaped profile having a first leg and a second leg. A mounting bracket includes an elongated bracket body having a base section that sits atop the first leg of the lateral frame member. A channel structure is formed at a first side of the base section and captures a free end of the first leg. A flexing leg is formed at the second side of the base section and extends downward from the base section alongside the second leg, wherein a lower end of the flexing leg includes an upwardly facing channel capturing a free end of the second leg. A lighting component is connected on the bracket to shine downward over a face of the sign assembly.

14 Claims, 6 Drawing Sheets

(56) References Cited

U.S. PATENT DOCUMENTS

| | | | |
|---|---|---|---|
| 2005/0174776 | A1 | 8/2005 | Althaus |
| 2007/0017131 | A1 | 1/2007 | Visotcky |

* cited by examiner

SIGN ASSEMBLY WITH LIGHT MOUNTING BRACKET

TECHNICAL FIELD

This application relates generally to signs, and more particularly to yard signs.

BACKGROUND OF THE INVENTION

Yard signs are used for a variety of different purposes, such as to advertise the sale of homes. A realtor's signage or placard is placed in a sign frame which is then placed in the yard of the home to be sold.

Various sign configurations exist, including metal frame signs in which the sign frame is formed of interconnected metal lengths having an L-shaped profile (e.g., lengths of angle iron). In the real estate market, in order to provide more effective marketing, it would be desirable if such signs were capable of holding solar light units that shine onto the signage panel(s) in the dark.

SUMMARY OF THE INVENTION

In one aspect, a sign assembly includes a frame comprising spaced apart first and second upright frame members and at least one lateral frame member interconnecting the first and second upright frame members, wherein the lateral frame member comprises an L-shaped profile having a first leg and a second leg, wherein the second leg extends downward from the first leg. A mounting bracket is connected to the lateral frame member for supporting a lighting unit. The mounting bracket includes an elongated bracket body having: a base section that sits atop the first leg of the lateral frame member; at least one channel structure formed toward a first side of the base section and capturing a free end of the first leg; and at least one flexing leg formed toward the second side of the base section and extending downward from the base section alongside the second leg, wherein a lower end of the flexing leg includes an upwardly facing channel capturing a free end of the second leg. A lighting component is connected on the bracket and configured to shine downward over a face of the sign assembly.

In another aspect, a mounting bracket is provided for engaging a lateral frame member of a yard sign, wherein the lateral frame member includes a first leg and a second leg, the second leg extending downward from the first leg. The mounting bracket includes an elongated bracket body having: a base section for sitting atop the first leg; at least one channel structure formed at a first side of the base section for capturing a free end of the first leg; at least one flexing leg formed at the second side of the base section, wherein a lower end of the flexing leg includes an upwardly facing channel for capturing a free end of the second leg. The flexing leg has a normal position in which the flexing leg extends downward from and beneath the base section such that the flexing leg forms an acute angle with the base section, in axial end view. The flexing leg has a mount position in which the flexing leg is shifted to an orientation that runs substantially perpendicular to the base section, in axial end view.

The details of one or more embodiments are set forth in the accompanying drawings and the description below. Other features, objects, and advantages will be apparent from the description and drawings, and from the claims.

DETAILED DESCRIPTION

Figure 1:
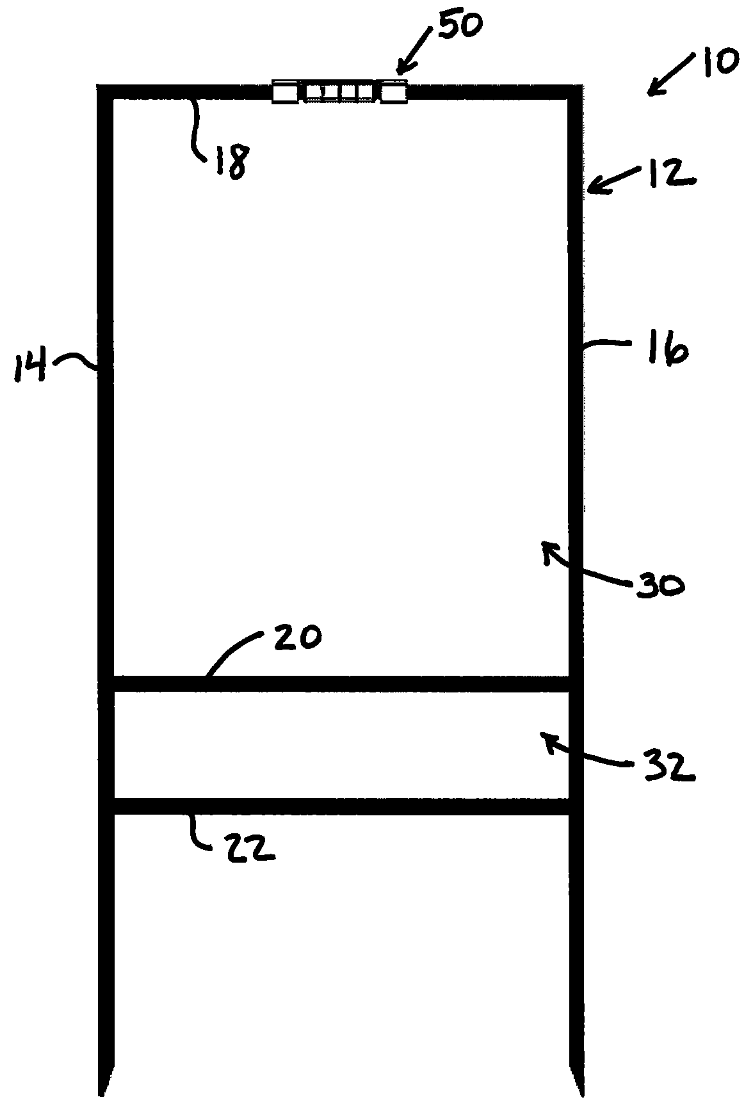
FIG. 1 is a front elevation view of a sign assembly.
Figure 2:
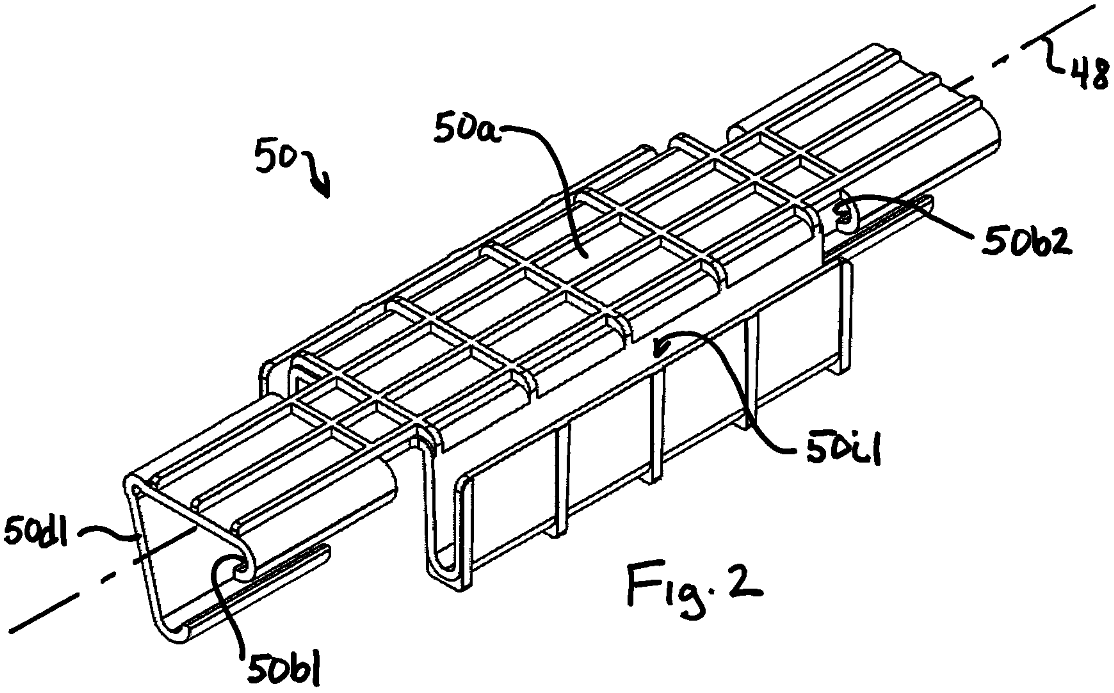
FIGS. 2-5 are perspective views of a mounting bracket of the sign assembly.
Figure 3:
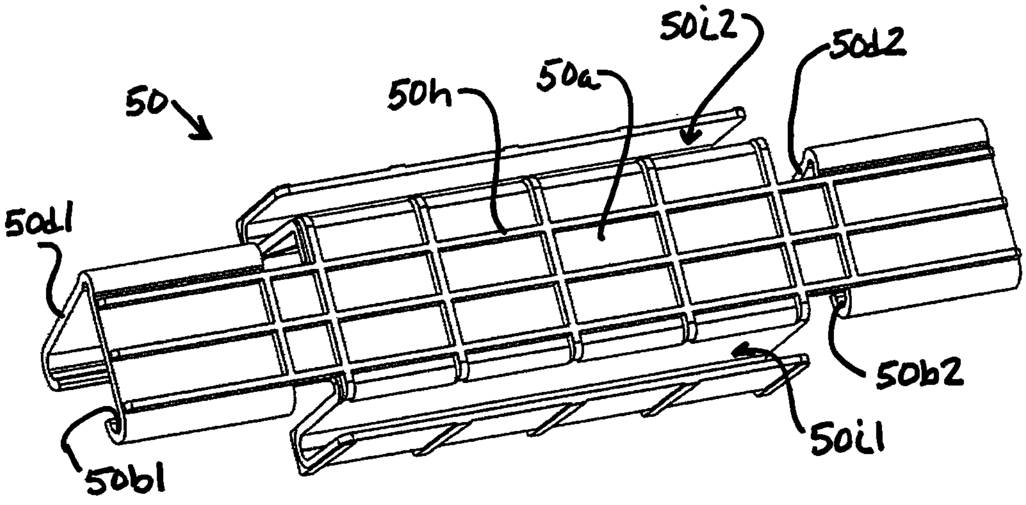
Figure 4:
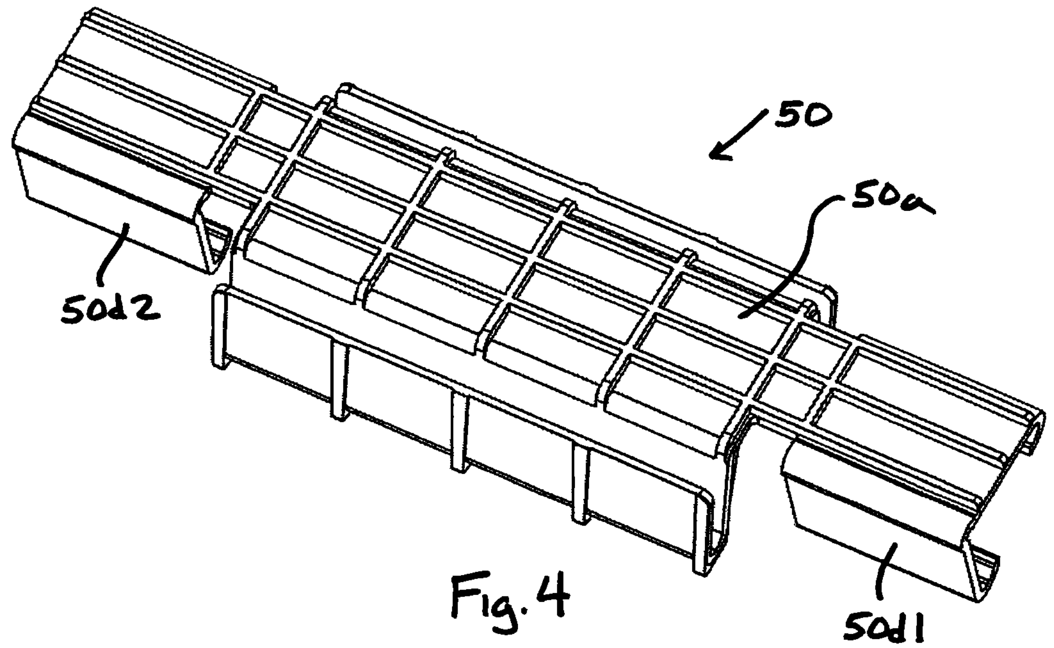
Figure 5:
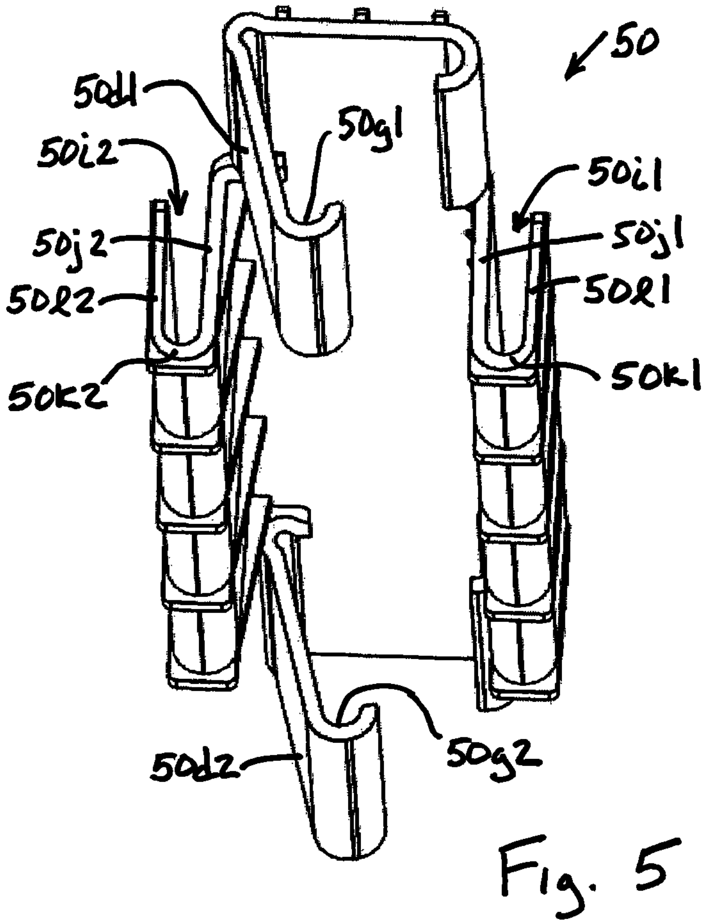
Figure 6:
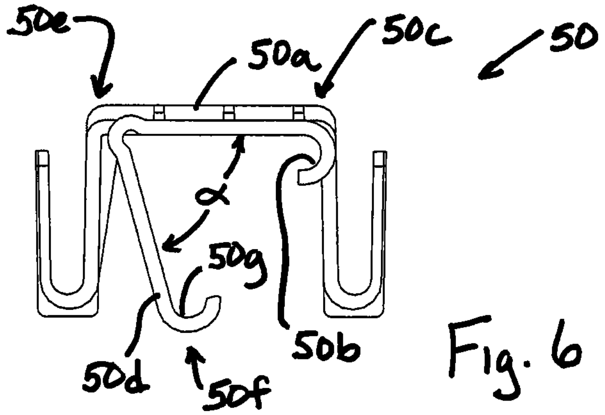
FIG. 6 is an axial end elevation view of the mounting bracket.
Figure 7D:
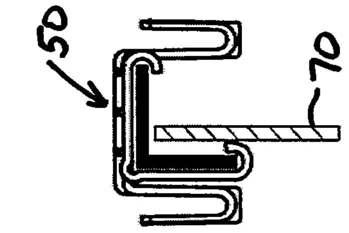
FIGS. 7A-7D depict bracket mounting.
Figure 7C:
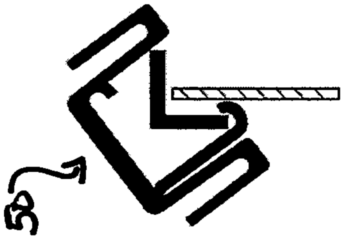
Figure 7B:
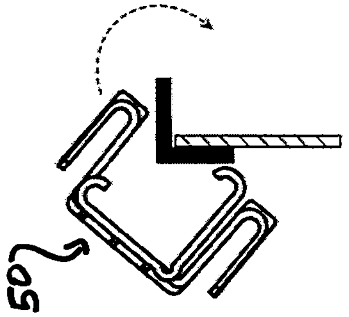
Figure 7A:
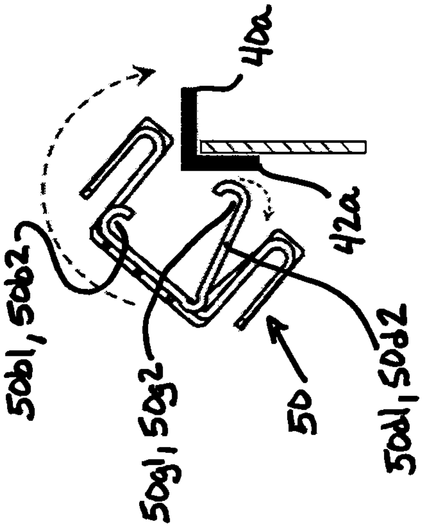
Figure 8:
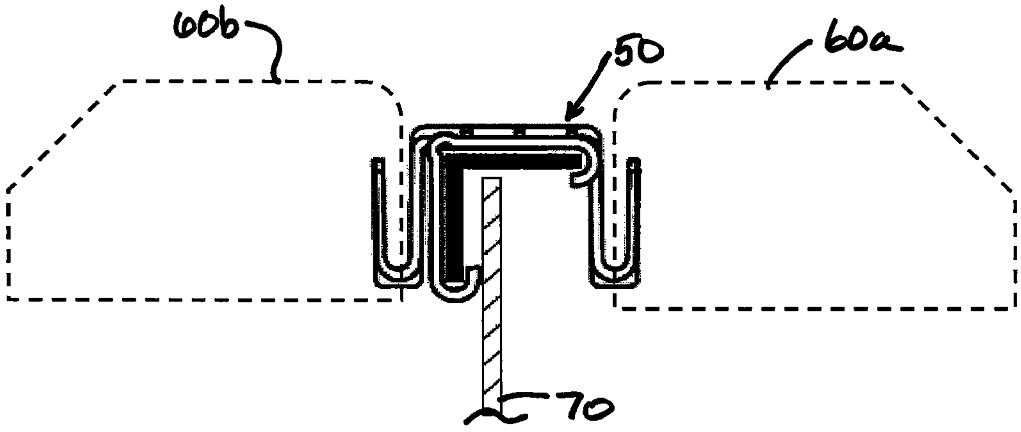
FIG. 8 is a partial side elevation showing lighting units mounted to the mounting bracket.

Referring to FIGS. 1-9, one embodiment of a sign assembly 10 is shown and includes a frame 12 that includes spaced apart upright frame members 14 and 16, and lateral frame members 18, 20 and 22 extending between the upright frame members 14 and 16. The lateral frame members 18, 20 and 22 typically run perpendicular to the upright frame members 14 and 16. All of the frame members may be formed of angle iron (being L-shaped) and welded together into the illustrated frame configuration.

The lateral frame member 20 is spaced vertically below the lateral frame member 18 to define a sign panel receiving space 30 therebetween, and the lateral frame member 22 is spaced vertically below the lateral frame member 20 to define a further sign panel receiving panel space 32 therebetween. A sign panel may be disposed in the sign panel receiving space 30, and a further sign panel may be disposed in the sign panel receiving space 32.

The lateral frame member 18 has an L-shaped profile, in axial end view, having a leg 40 and a leg 42, wherein the leg 42 extends downward from the leg 40. A mounting bracket 50 is connected to the lateral frame member 18 for supporting a lighting unit. The mounting bracket 50 comprises an elongated bracket body, with axis 48, having an upper base section 50*a* that sits atop the leg 40 of the lateral frame member 18 (when the bracket is mounted to the frame). At least one channel structure 50*b* is formed at a side 50*c* of the base section 50 and captures a free end 40*a* of the leg 40. At least one flexing leg 50*d* is formed at the opposite side 50*c* of the base section 50*a* and extends downward from the base section alongside the leg 42. A lower end 50*f* of the flexing leg 50*d* includes an upwardly facing channel structure 50*g* capturing a free end 42*a* of the leg 42.

In the illustrated embodiment, the at least one channel structure 50*b* comprises a first channel structure 50*b*1 at a first end of the base section 50*a* and a second channel structure 50*b*2 at a second end of the base section 50*a*. Similarly, the at least one flexing leg 50*d* comprises a first flexing leg 50*d*1, with associated channel structure 50*g*1, at the first end of the base section 50*a* and a second flexing leg 50*d*2, with associated channel structure 50*g*2, at the second end of the base section.

In one embodiment, the mounting bracket 50 is a molded plastic unit in which the flexing legs 50*d*1, 50*d*2 are formed unitary with the base section 50*a*, and the plastic material of the molded plastic unit allows the flexing legs to flex relative to the base section. Each flexing leg 50*d*1, 50*d*2 has a normal position, in which the flexing leg extends downward from and below the base section 50, such that the flexing leg forms an acute angle $\alpha$ with the base section, in axial end view, per FIG. 6.

Per the sequence of FIGS. 7A-7D, in order to mount the bracket 50 onto the lateral frame member 18, the bracket is first positioned with the channel structures 50*g*1, 50*g*2 of the flexing legs 50*d*1, 50*d*2 below the free end 42*a* of the leg 42.

The bracket is then shifted upward and rotated, such the free end 42*a* of the leg 42 is captured in the channel structures 50*g*1, 50*g*2. The rotation is carried out with sufficient force to cause the legs 50*d*1, 50*d*2 to flex to a position in which the channel structures 50*b*1, 50*b*2 capture the free end 40*a* of the leg 40. The flex in each flexing leg 50*d*1, 50*d*2 then applies a bias or clamping force to hold the mounting bracket 50 securely on the lateral frame member 18. Here, upon mounting, the flexing legs 50*d*1, 50*d*2 are shifted to orientations that run substantially perpendicular to the base section 50*a* of the bracket, in axial end view.

In the illustrated embodiment, the channel structures 50*b*1, 50*b*2, and the channel structures 50*g*1, 50*g*2, all have a c-shaped profile, in axial end view.

Here, the upper surface of the base section 50 includes a rib structure 50*h* for strengthening the base section. The rib structure has a lattice configuration. In implementations, the plastic material may be a fiberglass reinforced plastic material, such as a fiber reinforced thermoplastic (e.g., acrylonitrile butadiene styrene (ABS)), for increased strength.

Each side of the base section also includes a light mount structure, which here is in the form of upwardly facing light mount slots 50*i*1, 50*i*2 created by walls 50*j*1, 50*j*2 extending downwardly from the base section, turn walls 50*k*1, 50*k*2 and further walls 5011, 5012 extending back upward. However, other light mount structures/configurations could be incorporated onto the mount bracket.

Lighting components 60*a*, 60*b* can be connected on the bracket 50 and configured to shine downward over a face of the sign assembly, onto the sign panel receiving space and any sign panel 70 therein. For example, the lighting components 60*a*, 60*b* may be solar powered LED light modules.

The subject mounting bracket provides for simple installation of light components onto traditional real estate signs, when desired. The mounting bracket is easily removable through a reversal of the above-described installation operation.

It is to be clearly understood that the above description is intended by way of illustration and example only, is not intended to be taken by way of limitation, and that other changes and modifications are possible.

The invention claimed is:

1. A sign assembly, comprising:
- a frame comprising spaced apart first and second upright frame members and at least one lateral frame member interconnecting the first and second upright frame members, wherein the lateral frame member comprises an L-shaped profile having a first leg and a second leg, wherein the second leg extends downward from the first leg;
- a mounting bracket connected to the lateral frame member, the mounting bracket comprising an elongated bracket body having:
  - a base section that sits atop the first leg of the lateral frame member;
  - at least one channel structure formed toward a first side of the base section and capturing a free end of the first leg;
  - at least one flexing leg formed toward a second side of the base section and extending downward from the base section alongside the second leg, wherein a lower end of the flexing leg includes an upwardly facing channel capturing a free end of the second leg;
- a lighting component connected on the bracket and configured to shine downward over a face of the sign assembly.

2. The sign assembly of claim 1, wherein the mounting bracket is a molded plastic unit in which the at least one flexing leg is formed unitary with the base section, and a plastic material of the molded plastic unit allows the flexing leg to flex relative to the base section.

3. The sign assembly of claim 1, wherein the at least one channel structure formed at the first side of the base section comprises a first channel structure at a first end of the base section and a second channel structure at a second end of the base section.

4. The sign assembly of claim 1, wherein the at least one flexing leg formed at the second side of the base section comprises a first flexing leg at a first end of the base section and a second flexing leg at a second end of the base section.

5. The sign assembly of claim 1, wherein the at least one channel structure formed at the first side of the base section comprises a c-shaped profile in axial end view, and the upwardly facing channel comprises a c-shaped profile in axial end view.

6. The sign assembly of claim 1, wherein a first upwardly facing light mount slot is formed at the first side of the base section and a portion of the lighting component is engaged in the upwardly facing light mount slot.

7. The sign assembly of claim 1, wherein at least one of an upper surface or a lower surface of the base section includes a rib structure for strengthening the base section.

8. A mounting bracket for engaging a lateral frame member of a yard sign, wherein the lateral frame member includes a first leg and a second leg, the second leg extending downward from the first leg, the mounting bracket comprising:
- an elongated bracket body having:
  - a base section for sitting atop the first leg;
  - at least one channel structure formed at a first side of the base section for capturing a free end of the first leg;
  - at least one flexing leg formed at a second side of the base section, wherein a lower end of the flexing leg includes an upwardly facing channel for capturing a free end of the second leg;
  - wherein the flexing leg has a normal position in which the flexing leg extends downward from and beneath the base section such that the flexing leg forms an acute angle with the base section, in axial end view;
  - wherein the flexing leg has a mount position in which the flexing leg is shifted to an orientation that runs substantially perpendicular to the base section, in axial end view.

9. The mounting bracket of claim 8, wherein the mounting bracket is a molded plastic unit in which the at least one flexing leg is formed unitary with the base section, and a plastic material of the molded plastic unit allows the flexing leg to flex relative to the base section.

10. The sign assembly of claim 8, wherein the at least one channel structure formed at the first side of the base section comprises a first channel structure at a first end of the base section and a second channel structure at a second end of the base section.

11. The sign assembly of claim 8, wherein the at least one flexing leg formed at the second side of the base section comprises a first flexing leg at a first end of the base section and a second flexing leg at a second end of the base section.

12. The sign assembly of claim 8, wherein the at least one channel structure formed at the first side of the base section comprises a c-shaped profile in axial end view, and the upwardly facing channel comprises a c-shaped profile in axial end view.

13. The sign assembly of claim 8, wherein a first upwardly facing light mount slot is formed at the first side of the base section.

14. The sign assembly of claim 8, wherein at least one of an upper surface or a lower surface of the base section includes a rib structure for strengthening the base section.

* * * * *